(12) United States Patent
de Castro et al.

(10) Patent No.: US 7,539,771 B2
(45) Date of Patent: May 26, 2009

(54) ORGANIZATIONAL LOCALITY IN PREFIX-BASED STRUCTURED PEER-TO-PEER OVERLAYS

(75) Inventors: Miguel Oom Temudo de Castro, Cambridge (GB); Antony Rowstron, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 755 days.

(21) Appl. No.: 10/456,312

(22) Filed: Jun. 6, 2003

(65) Prior Publication Data
US 2004/0249970 A1    Dec. 9, 2004

(51) Int. Cl.
*G06F 15/16* (2006.01)
(52) U.S. Cl. .............. 709/238; 709/239; 709/241; 709/242
(58) Field of Classification Search .......... 709/238, 709/220, 245, 241, 242, 239
See application file for complete search history.

(56) References Cited

U.S. PATENT DOCUMENTS

| | | | | |
|---|---|---|---|---|
| 6,115,753 | A * | 9/2000 | Joens ................ | 709/242 |
| 6,366,954 | B1 * | 4/2002 | Traversat et al. ........ | 709/220 |
| 2003/0152092 | A1 * | 8/2003 | Lu .................. | 370/408 |
| 2003/0212771 | A1 * | 11/2003 | Kwon et al. ............ | 709/220 |
| 2004/0230696 | A1 * | 11/2004 | Barach et al. .......... | 709/238 |

* cited by examiner

*Primary Examiner*—William C Vaughn, Jr.
*Assistant Examiner*—Djenane M Bayard

(57) ABSTRACT

Content and/or Path locality may be obtained using DHT protocols by assigning network nodes with individual node identifiers (IDs) in a hierarchical namespace. The hierarchical node IDs may be assigned to reflect organizational boundaries within the network. Therefore, with the structured overlay defined using these hierarchically assigned node IDs, a routing algorithm that uses prefix-matching can provide path locality. Furthermore, a domain prefix may be combined with data identifier derived from the data itself to create an enhanced data key. The use of the enhanced data key with a DHT protocol in this structured overlay can provide content locality.

5 Claims, 8 Drawing Sheets

FIG. 3

ORGANIZATIONAL LOCALITY IN PREFIX-BASED STRUCTURED PEER-TO-PEER OVERLAYS

TECHNICAL FIELD

The invention relates generally to communication networks, and more particularly to structured peer-to-peer overlays.

DESCRIPTION

Peer-to-peer overlays provide a flexible approach for connecting multiple nodes in a communications network. Examples of peer-to-peer applications include content distribution networks and peer-to-peer file sharing and archiving. Individual nodes represent hardware and/or software components that support a shared communications protocol to allow communications among the nodes.

One family of peer-to-peer overlay protocols is referred to as Distributed Hash Tables (DHT), which provides routing and object location functionality for peer-to-peer applications. A DHT protocol provides an efficient and easily implemented substrate, referred to as a structured overlay, for building scalable and self-organizing distributed applications. A structured overlay maps keys that identify application data to overlay nodes that are responsible for managing that data.

Generally, using a DHT protocol, data may be stored and accessed within the peer-to-peer overlay in accordance with a data key, which is typically derived from the data (e.g., by hashing the data content or a descriptor of the data). However, the specific node or nodes at which the data is stored is not well controlled by the source node using a DHT protocol. That is, the data is merely stored and accessed within the network using of the data key, typically at the network node having the closest numerical match with the data key. This node and the source node may be in different organizations. Therefore, under certain circumstances, the data may even be stored at undesirable nodes (e.g., a competitor's node or at a great network distance from the source). Furthermore, as one overlay node (i.e., a node in a given organization) communicates with another overlay node in the same organization, message traffic between the two overlay nodes may pass through arbitrary overlay nodes in other organizations (e.g., within a competitor's network).

Therefore, in many peer-to-peer applications, content and/or path locality are desired or required. Content locality refers to the ability to explicitly place data in a specific overlay node or to distribute it across multiple overlay nodes in a specific organization. Path locality refers to the capability of guaranteeing that message traffic between overlay nodes in the same organization is routed only through nodes within that organization. For example, an organization may want to ensure that content it generates is only stored on nodes that it owns (an example of content locality) and that messages routed from one node that it owns to another node that it owns are only communicated through overlay nodes that it owns (an example of path locality). It has been claimed, however, that content and path locality cannot be achieved using existing DHT protocols.

Implementations described and claimed herein overcome this claimed disadvantage of DHT protocols by assigning network nodes with individual node identifiers (IDs) in a hierarchical namespace and/or by using a prefix-matching routing protocol. The hierarchical node IDs may be assigned to reflect organizational boundaries within the network, such as "Microsoft.Europe.Cambridge.msrc-antr" and "Microsoft.US.Redmond.msrc-miguelc", where "Microsoft", "Microsoft.Europe.Cambridge" and "Microsoft.US" are examples of domain prefixes. Therefore, with the structured overlay using these hierarchically assigned node IDs, a routing algorithm that uses prefix-matching can provide path locality. Furthermore, a domain prefix may be combined with a data key (e.g., generated randomly or derived from the data) to create an enhanced data key. Therefore, use of the enhanced data key with a prefix-matching protocol in this structured overlay can provide content locality.

In various implementations, articles of manufacture are provided as computer program products. One implementation of a computer program product provides a computer program storage medium readable by a computer system and encoding a computer program that assigns node identifiers. Another implementation of a computer program product may be provided in a computer data signal embodied in a carrier wave by a computing system and encoding the computer program that assigns node identifiers.

The computer program product encodes a computer program for executing on a computer system a computer process for assigning node identifiers. A peer-to-peer overlay node is assigned a node identifier defined in a hierarchical namespace designating one or more organizational levels. An organizational boundary in each node identifier is aligned with a routing boundary of the node identifier.

In another implementation, a method is provided. A peer-to-peer overlay node is assigned a node identifier defined in a hierarchical namespace designating one or more organizational levels. An organizational boundary in each node identifier is aligned with a routing boundary of the node identifier.

In yet another implementation, a structured peer-to-peer overlay is provided. A plurality of peer-to-peer overlay nodes is referenced. Each peer-to-peer overlay node is associated with a node identifier defined in a hierarchical namespace designating one or more organizational levels. An organizational boundary in the node identifier is aligned with a routing boundary of the node identifier.

Other implementations are also described and recited herein.

Brief descriptions of the drawings included herein are listed below.

FIG. 3 illustrates a portion of an exemplary routing table associated with a node of FIG. 2.

A peer-to-peer overlay can be configured in a self-organizing, structured overlay of network nodes, wherein each overlay node routes messages (e.g., data, objects, packets, etc.) within the overlay and interacts with local instances of one or more applications. In an exemplary peer-to-peer overlay employing a specific DHT protocol, a node identifier (ID) is assigned to each node in the network. In one implementation, each node ID is a 128-bit value identifying the nodes in a circular 128-bit node ID namespace. It should be understood, however, that node ID namespaces of other sizes and configurations are also contemplated, including a 160-bit space or a hierarchical namespace.

Node IDs may be chosen from a hierarchical namespace to achieve content and path locality. For example, in one implementation, different organizational levels may be designated by assigning node IDs as strings in a hierarchical name space (e.g., Microsoft.Europe.Cambridge.msrc-antr). The node ID may be an arbitrary length, and the strings may be non-textual. Furthermore, an explicit separator may or may not be used to delimit the organizational levels, although any character may be used as a delimiter (e.g., a period in this example), if so desired.

Prefix-matching routing algorithms route by forwarding data to nodes that match increasingly longer prefixes of the destination key associated with the data. Such algorithms use a parameter b to control the number of bits in each digit of the key (i.e., the number of bits that are matched at each routing hop). Each character of a key may include a predetermined number of one or more digits. If each character in a node ID may be represented by e bits, then b is selected such that e is a multiple of b (e.g., b=4, e=8, such that 2 digits equal 1 character). Therefore, each character of a key is guaranteed to fall on a digit boundary of the key. In this manner, organizational boundaries of a hierarchical node ID or data key align with the digit boundaries of the node ID used when routing (i.e., referred to as a "routing boundary"). It should be understood, however, that alternative constraints may also be employed to provide that organization boundaries are aligned with the routing boundaries used.

Figure 1:
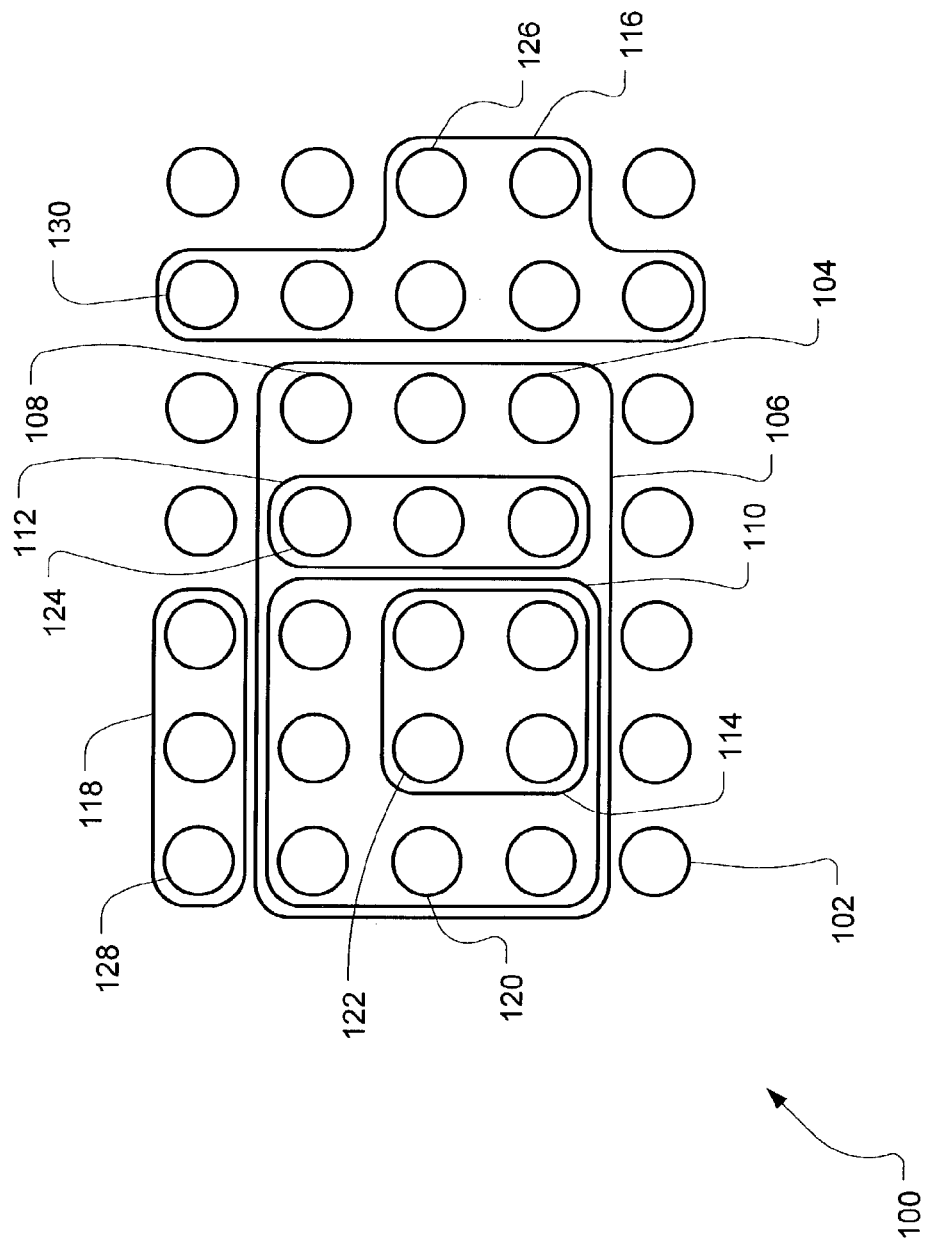
FIG. 1 illustrates a schematic of logical hierarchy in an exemplary peer-to-peer overlay.

FIG. 1 illustrates a schematic of logical hierarchy in an exemplary peer-to-peer overlay 100. Each node (represented by a circle, such as node 102) is interconnected with other nodes in the network by communication links (not shown). Some nodes, such as node 102, are positioned at the root of the hierarchical name space (e.g., such a node may have a unique node ID equaling "Loner1"). In contrast, other nodes, such as node 104, belong to an organizational level having multiple nodes within it. For example, such an organizational level 106 may represent "Microsoft", such that the unique node ID for node 104 might be "Microsoft.MSDN_library" while the unique node ID for node 108 might be "Microsoft.MSDN_admin"). In these examples, the boundaries between organizational levels in the hierarchical namespace are delimited by ".", although a delimiter may not be required to identify different organizational levels.

Likewise, other organizational levels may exist within the Microsoft organizational level 106, such as the "US" level 110 and the "Europe" level 112. Within the Microsoft level 106 and within the "US" level 110, another organizational level 114 ("Redmond") may exist in the hierarchical namespace. Furthermore, other organizational levels may exist outside the Microsoft level 106, such as organizational level 116 ("GeneralMotors") and organizational level 118 ("Sony"). Therefore, using these examples, the exemplary unique node IDs in a hierarchical namespace for the following nodes are given: the node ID for node 120 equals "Microsoft.US.DC_Sales_Manager"; the node ID for node 122 equals "Microsoft.US.Redmond.msr_stevea"; the node ID for node 124 equals "Microsoft.Europe.London_Sales_Manager"; the node ID for node 126 equals "GeneralMotors.CEO"; and the node ID for node 128 equals "Sony.CFO". It should be understood that these examples are merely provided to describe the concept of hierarchical names spaces in a structured overlay.

To store an object in the exemplary peer-to-peer overlay represented in FIG. 1, an exemplary DHT protocol may hash content or a content descriptor of the object to create a data key. Then, the object may be routed to the node having a node ID that is numerically closest to the data key. In a typical DHT environment, the specific location of the destination node within the peer-to-peer overlay and the routing path to the destination node are generally independent of the sender's preferences and the organizational character of the data. As such, the object may be stored anywhere in the network and may travel anywhere in the network to reach its destination.

With content locality, however, data may be (1) stored at an explicitly specified overlay node or (2) distributed for storage within only a specified organizational level. For example, with feature (1), data may be stored to an explicitly specified node "Microsoft.US.Redmond.msr_stevea". With feature (2) of content locality, an organization may store its data throughout nodes in a given internal organizational level (e.g., "Microsoft.US") and later access the data, even if the network connection outside the organizational level is lost, while distributing the load within the organization to store and manage the data. Similarly, data needed for autonomous or secure activities within a campus or a building can be stored and accessed locally to preserve autonomy or security. For example, with content locality, a source node can specify that an object is to be stored or distributed only to nodes within the "Microsoft.US.Redmond" organizational level 114.

Path locality guarantees that message traffic between two overlay nodes within the same organization is routed only within that organization. For example, if a message is sent from node 126 in the "GeneralMotors" organizational level 116 to node 130 in the "GeneralMotors" organizational level 116, it may be undesirable for the message to be routed through other organizations (e.g., nodes within Sony). The path locality feature therefore improves security by ensuring that message traffic is not routed to non-secure regions of the peer-to-peer overlay.

In a DHT protocol, each node maintains a routing table R containing node IDs and IP (internet protocol) addresses of other nodes in the peer-to-peer overlay. A node uses the routing table to route received or original messages through the overlay. Generally, a routing table in a DHT protocol contains routing information associated with a subset of nodes in the overlay. That is, rather than including node information for all nodes in the overlay (which would result in an excessively large routing table), the routing table may include the node IDs and addresses for less than the complete set of the nodes within the network.

Each message communicated within the overlay is associated with a destination data key that identifies the data item to which the message relates. Generally, a data key (e.g., a 128 bit hash value in a circular 128-bit node ID namespace) may be created by hashing the data or data descriptor or some other information relating to the data. Each data key (or simply "key") is mapped by the overlay to a unique, live overlay node, called the key's "root". A key's root is defined as the node having the node ID with the longest prefix match with the data key that is numerically closer. A DHT protocol routes messages having a given key to the key's associated root (i.e., the target node).

When a node receives a message having a given key, the message is forwarded "toward" the target node (as designated by the key) by transmitting the message to the node identified in the routing table as the longest prefix match with the key. If no such node can be found, then the key is forwarded to a node sharing the same length prefix match as the current node with the key and that is numerically closer to the key's root. In this manner, the message eventually propagates through zero or more intermediate nodes to the key's root, absent other problems in the network (e.g., absent failure of many adjacent nodes simultaneously).

For the purposes of routing, exemplary node IDs and keys are represented by a sequence of digits in some base (for example, in one implementation, the base is of the form $2^b$, where b is a configuration parameter with an exemplary value of 4). The choice of b involves a trade-off between the size of the populated portion of the routing table (approximately $\log_{2^b} N \times (2^b-1)$ entries) and the maximum number of hops required to route between any pair of source and target nodes. For example, in one embodiment, a node's routing table is organized into $\log_{2^b} N$ rows and $2^b$ columns. In this configuration, the expected number of hops (i.e., transmission between network nodes) required to route between a source node and a target node is approximately $\log_{2^b} N$, although other configurations are also contemplated. Therefore, in the example, with a value of b=4 and $10^6$ nodes, a routing table contains on average 75 entries and the expected number of hops if 5, while with $10^9$ nodes, the routing table contains on average 105 entries and the expected number of routing hops is 7.

In the exemplary configuration described above, the $2^b$ entries in row r of the routing table contain the IP addresses of the nodes having node IDs matching the first r digits with the present node's node ID. Digit r+1 of the node ID of the node in column c of row r equals c. The column in row r that corresponds to the value of digit r+1 of the local node's node ID remains empty. A routing table entry is also left empty if no node with the appropriate node ID prefix is known. It should be understood, however, that other routing table configurations are also contemplated, such as those described with regard to CAN (Sylvia Ratnasamy, Paul Francis, Mark Handley, Richard Karp, and Schott Shenker, "A Scalable Content Addressable Network", Proceedings of ACM SIGCOMM 2001—http://citeseer.nj.nec.com/ratnasamy01scalable.html), Chord (Ion Stoica, Robert Morris, David Karger, M. Frans Kaashoek, and Hari Balakrishnan, "Chord: A Scalable Peer-to-peer Lookup Service for Internet Applications", ACM SIGCOMM 2001, Sand Diego, Calif., August 2001, pp. 149-160), and Tapestry (Ben Y. Zhao, John Kubiatowicz, and Anthony Joseph, "Tapestry: An Infrastructure for Fault-tolerant Wide-area Location and Routing", UCB Tech. Report UCB/CSD-01-1141.

Furthermore, in one implementation, each network also maintains a leaf set of node in which half of the leaf set includes the numerically closest larger node IDs and the other half of the leaf set includes the numerically closest smaller node IDs. Each node is typically responsible for notifying applications of changes to its leaf set.

When routing a message in a peer-to-peer overlay having the above described routing table and leaf set, an exemplary process for routing the message at a given node A may be described as follows. If the data key D is within the range of the nodes contained in the leaf set of the node A, the node forwards the data to the leaf set node having the longest prefix match between the data key D and the leaf set node's node ID. If there are several nodes with the same length of prefix match, then the node with the minimal numerical distance between the data key D and the leaf set node's node ID is selected. However, if the data key D is not within the range of the nodes contained in the leaf set of the node A, then the routing table is used.

First, the length $l_{sh}$ of the prefix shared by the data key D and the node ID of node A is determined. For example, a data key equaling "10233033" and a node ID equaling "10234023" have a shared length $l_{sh}$ equaling 4. Then, the message is forwarded to the IP address of the node with a node ID sharing a shared prefix of length $l_{sh}+1$ with the data key D (i.e., the IP address at row $l_{sh}$ and column c of the routing table, where column c equals the digit in the $l_{sh}$-th place of the data key D). However, in some circumstances, the entry in (row $l_{sh}$, column c) is empty. In such case, the message is forward to another node specified in the routing table sharing a shared prefix of length $l_{sh}$ with the data key D and that is numerically closer to the data key D than the present node A's ID. (If no such node is round in the routing table, the node can be found in the leaf set.)

Figure 2:
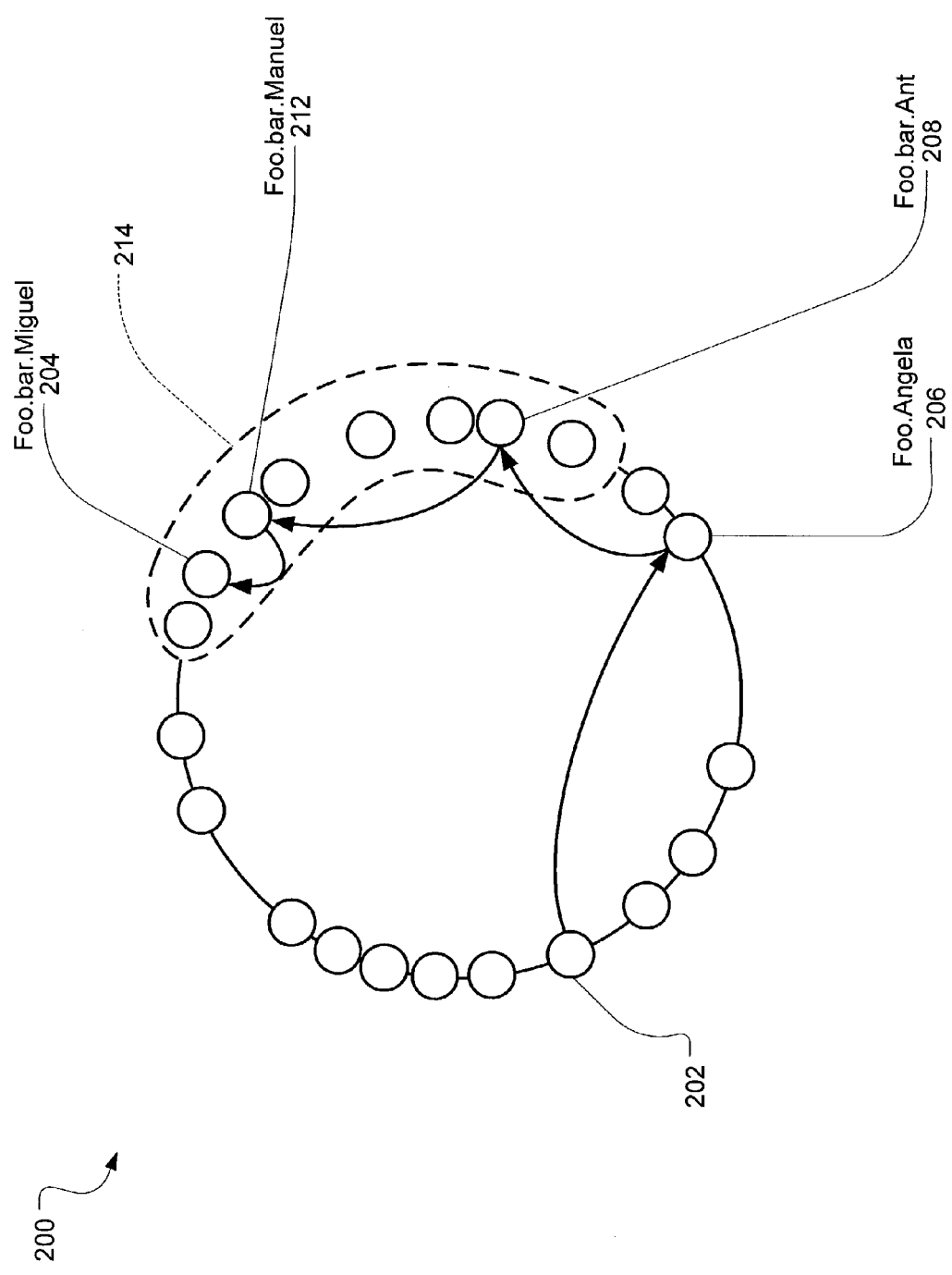
FIG. 2 illustrates an exemplary routing within a distribution of nodes in a circular ID namespace.

FIG. 2 illustrates an exemplary routing within a distribution of nodes in a circular ID namespace 200. In one implementation, different levels of a network hierarchy may be designated by assigning node IDs as strings in a hierarchical name space (e.g., Microsoft.Europe.Cambridge.msrc-antr). The node ID may be of an arbitrary length. Generally, an explicit separator may or may not be used to delimit the hierarchical levels. Furthermore, any character may be used as a delimiter (e.g., a period in this example). If each character in a node ID is represented by e bits, then b is selected such that e is a multiple of b. For example, in FIG. 2, b=8 and e=8 (an 8-bit ASCII character set). In this manner, each organizational boundary in the node ID will align on a routing boundary.

A circular ID namespace 200 can be used with DHT protocols to provide content and/or path locality. For example, a source node 202 can initiate routing of data to a specified data object that was explicitly placed on node 204 having the node ID "Foo.bar.Miguel" using an exemplary data key "Foo.bar.MiguelX", where "Foo.bar.Miguel" represents a domain prefix specifying the destination node 204 and 'X' represents a data identifier generated by hashing the data, data descriptor, or other related information. By combining the domain prefix with the data identifier within the structured overlay having the hierarchical namespace, content locality may be provided using a DHT protocol (as described in more detail below).

In this example, the source node 202 does not have the information (e.g., the IP address) to transmit the message directly to the node 204 having the node ID "Foo.bar.Miguel". Therefore, the message is "routed" progressively through the peer-to-peer overlay using routing tables of multiple nodes.

A node 206 having the node ID "Foo.Angela" is in the routing table of source node 202 and has the longest prefix match to the data key for nodes stored in the routing table of source node 202. Therefore, the source node 202 transmits the message to node 206. After the message is received by node 206, it is routed to the node having the node ID with the longest prefix match for nodes stored in the routing table of node 206, namely node 208 having the node ID "Foo.bar.Ant". Likewise, node 208 will route to node 212 having the node ID "Foo.bar.Manuel", and node 212 will route to node 204 having the node ID "Foo.bar.Miguel". It should be understood that this example assumes that the routing tables of the various nodes include information that will result in the described routing.

By employing the hierarchical namespace and having each organizational boundary coincide with a routing boundary, path locality is maintained using a DHT protocol. That is, once a message (having a destination data key including a given organizational level as a prefix) is received by a node within that organizational level, the message will not be routed outside that organizational level. Accordingly, once the message was received within the "Foo" organizational level of FIG. 2, it was not routed outside of "Foo". Likewise, once the message was received within the "Foo.bar" organizational level of FIG. 2, it was not routed outside of "Foo.bar". The dashed region 214 encompasses nodes at the "Foo.bar" organizational level or lower. These nodes are grouped together in accordance with the hierarchical naming convention described herein.

By incorporating the domain prefix into the data key and routing the message in a structured overlay defined in a hierarchical namespace, prefix matching in the routing algorithm provides content locality. For example, content locality is demonstrated by the receipt of the message by the specified node 204 having the node ID "Foo.bar.Miguel". Content locality may have also been demonstrated by routing a message using a data key incorporating the domain prefix "Foo.bar", for receipt and/or storage only by nodes in the "Foo.bar" organizational level.

Figure 3:
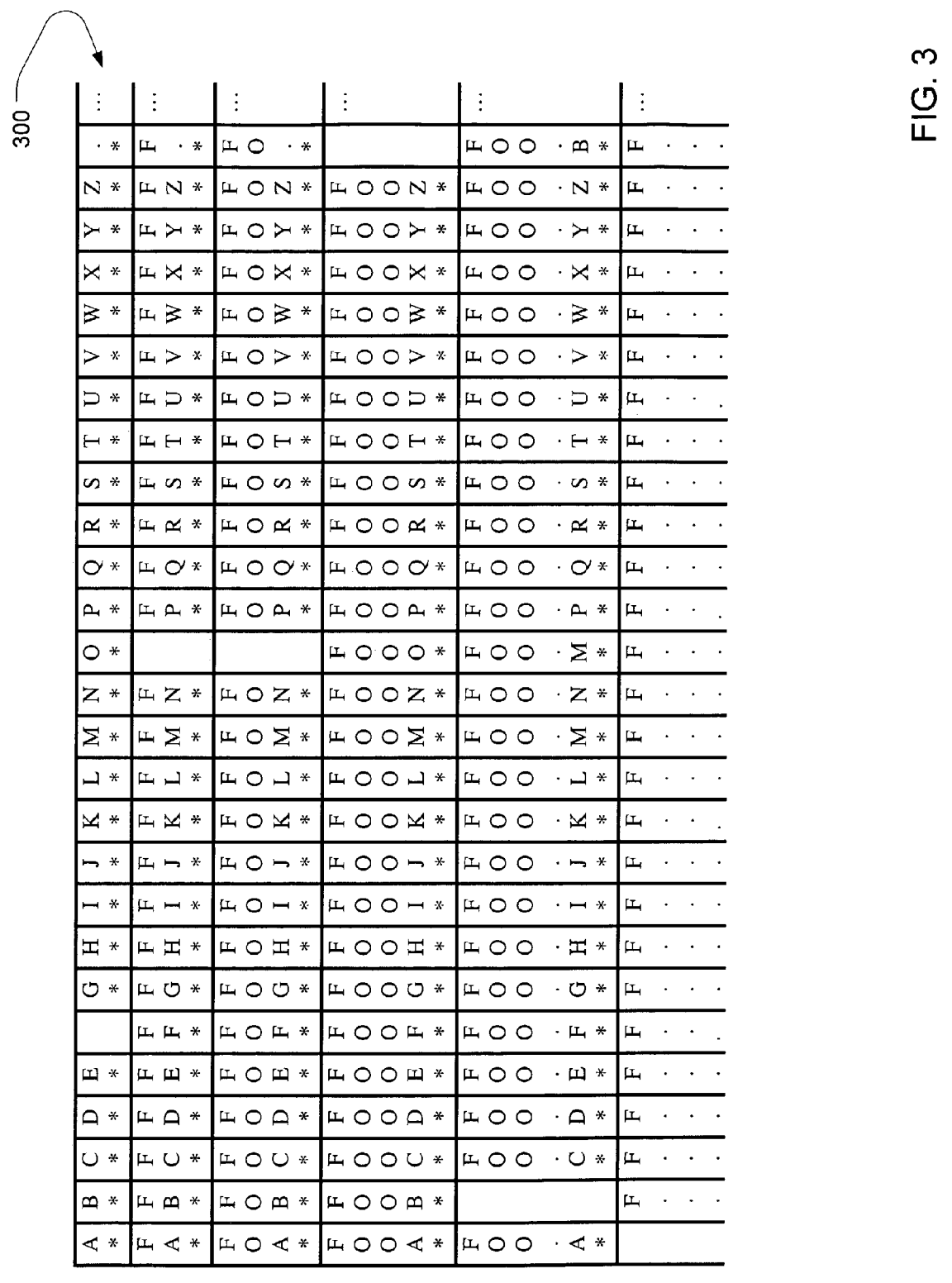

FIG. 3 illustrates a portion of an exemplary routing table 300 associated with a node of FIG. 2. The possible values for each character position in the node ID are listed in the columns. Note: the routing table continues to the left to include the remaining character values in the 8-bit character space and continues downward to include remaining character positions in the node IDs, but these portions are not shown. Each row corresponds to a character position in the node IDs within the network. Each table element stores a node ID pattern and an IP address (not shown) for the associated node (i.e., potentially, the next node in the routing progression). The "*" symbol represents a wildcard that matches any pattern. As such, the node ID pattern "A*" is satisfied by any data key starting with an "A" character.

The empty table elements represent prefixes satisfied by the current node (i.e., the node with which the routing table is associated). For example, table elements for "F*", "FO*", "FOO*", "FOO.*", "FOO.B*", and "FOO.BA*" are empty, signifying that the current node has a node ID prefix of "FOO.BA". Therefore, the routing table 300 cannot be the routing table of node 206 (Node ID="Foo.Angela") in FIG. 2, but may be the routing table for one of nodes 208, 210, 212, 204, or one of the other nodes having the node ID prefix "FOO.BA".

After a message is received at a node having routing table 300, the data key of the node is compared to table elements of the routing table 300. The table element having the longest prefix match with the data key is selected and the message is forwarded to the IP address associated with the table element. As discussed previously, some optimizations and exceptions may be implemented, such as when a node ID of a table element matches the entire data key, when the table element having the longest prefix match does not have an associated IP address, etc.

Figure 4:
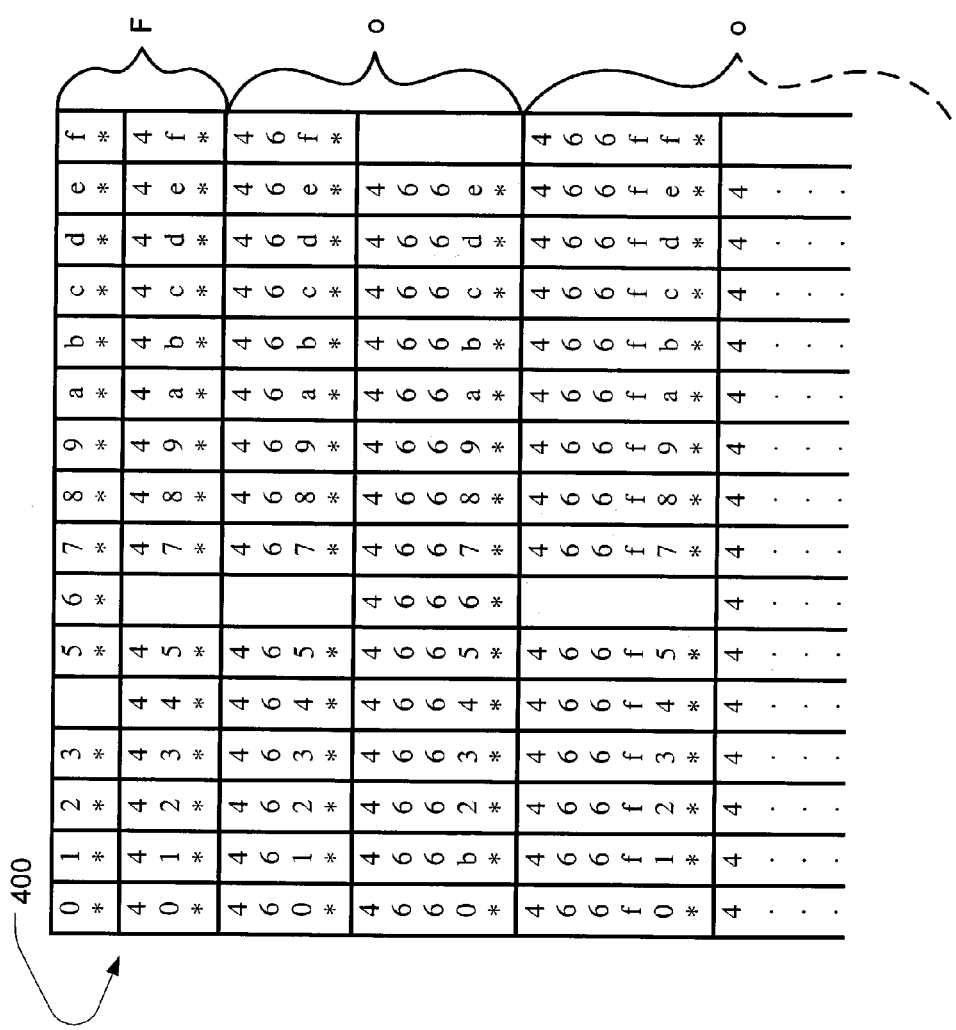
FIG. 4 illustrates a portion of an exemplary routing table associated with a node in another circular ID namespace.
Figure 5:
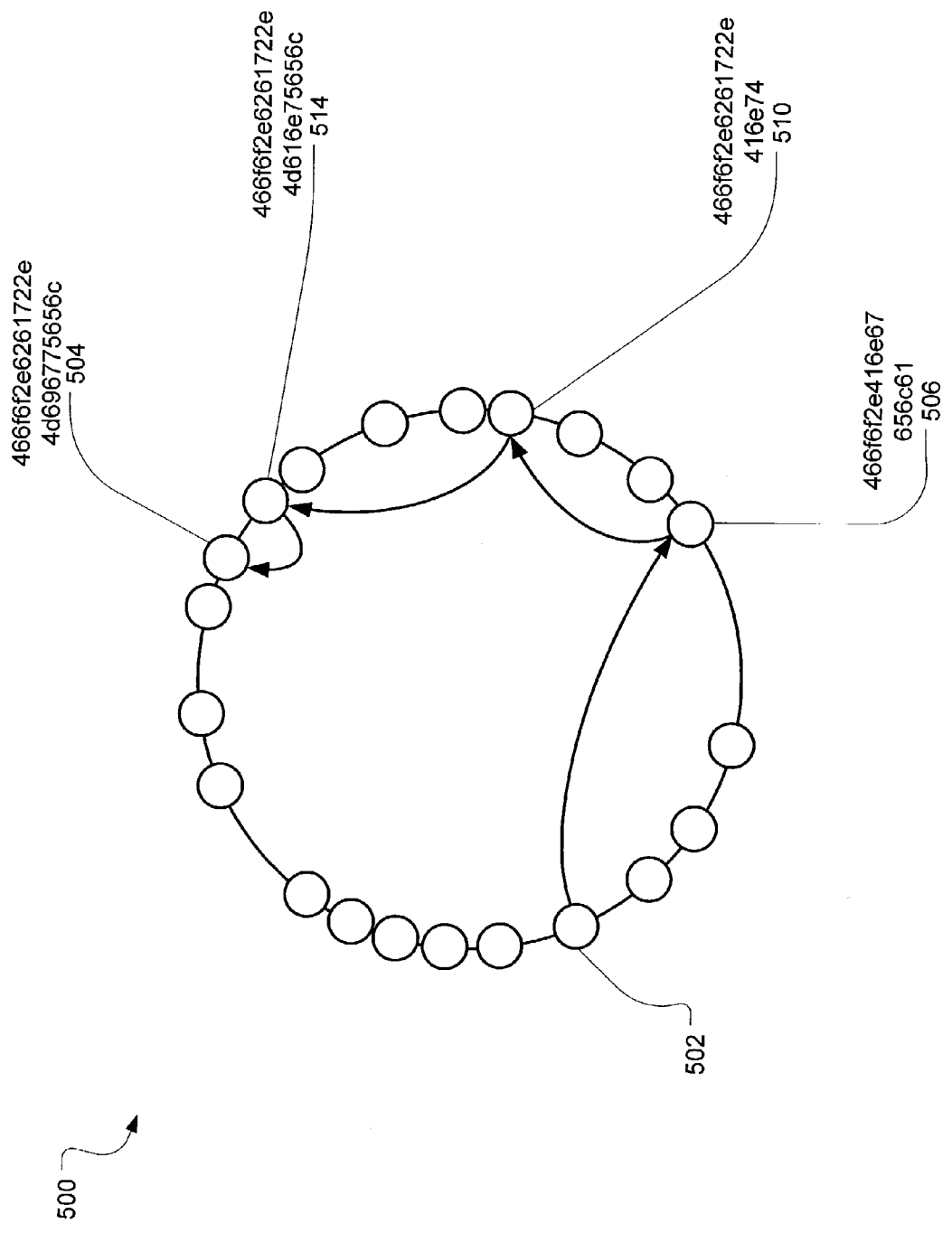
FIG. 5 illustrates an exemplary routing within a circular ID namespace associated with the routing table shown in FIG. 4.

FIG. 4 illustrates an exemplary routing table associated with a node in another circular ID namespace 400. Note: the routing table continues downward to include remaining digit positions in the node IDs, but these portions are not shown. For many applications, the circular ID namespace represented in FIGS. 2 and 3 requires an unnecessarily large routing table for each node because an 8-bit base is used in routing. An alternative base may be employed, as shown in FIGS. 4 and 5, in which each string character (e.g., "F") is represented by a 2-digit value comprised of 4-bit digits (i.e., b=4 and e=8). For example, in FIGS. 4 and 5, a standard ASCII character format may be employed, such that the string character "F" is represented by the 2-digit hex value "46", "o" is represented by "6f", etc. This approach reduces the size of the routing table for each node.

FIG. 5 illustrates an exemplary routing within a circular ID namespace 500 associated with the routing table shown in FIG. 4. A source node 502 can initiate routing of a message to a specified node 504 having the node ID "466f6f2e6261722e4d696775656c" (corresponding to "Foo.bar.Miguel") using an exemplary data key "466f6f2e6261722e4d696775656cX", where "466f6f2e6261722e4d696775656c" represents a domain prefix specifying the specified destination node 504 and 'X' represents a data identifier generated by hashing the data, data descriptor, or other related information. By combining the domain prefix with the data identifier within the structured overlay having the hierarchical namespace, content locality may be provided in a DHT environment.

In this example, the source node 502 does not have the information (e.g., the IP address) to transmit directly to the node 504 having the node ID "466f6f2e6261722e4d696775656c". Therefore, the message is "routed" progressively through the peer-to-peer overlay using routing tables of multiple nodes.

A node 506 having the node ID "466f6f2e416e67656c61" (corresponding to "Foo.Angela") is in the routing table of source node 502 and constitutes the longest prefix match to the data key for nodes stored in the routing table of source node 502. Therefore, the source node 502 transmits the message to node 506. After the message is received by node 506, it is routed to the closest numerical prefix match for nodes stored in the routing table of node 506, namely node 508 having the node ID "466f6f2e6261722e416e74" (corresponding to "Foo.bar.Ant"). Likewise, node 508 will route to node 514 having the node ID "466f6f2c6261722e4d616e75656c" (corresponding to "Foo.bar.Manuel"), and node 514 will route to node 504 having the node ID "466f6f2e6261722e4d696775656c" (corresponding to "Foo.bar.Miguel"). It should be understood that this example assume that the routing tables of the various nodes include information that will result in the described routing.

Constrained load balancing may also be added to this architecture by adding virtual nodes. In this implementation, when a node joins the overlay, it is assigned an original node ID in the manner described above. In addition, the node generates one or more virtual node IDs to define virtual nodes (having the same IP address as the joining "real" node). The virtual node IDs for the network nodes share a prefix with the original node ID concatenated with a random number for each parent domain in which the original node participates in load balancing. The network node then joins the structured overlay using its node ID and each of these virtual node IDs by informing other nodes of its existence in the network, including its node IDs (real and virtual) as well as its network (e.g., IP) address and by building its routing table using the similar information from neighboring overlay nodes.

Using virtual nodes, for example, a given node will have multiple node IDs (e.g., "Foo.bar.Miguel", "Foo.bar.<Random1>", "Foo.bar.<Random2>, and "Foo.<Random3>", where < . . . > designates a random string). In this manner, when a data object is designated to be stored within a given organizational level, the given node (e.g., as designated by "Foo.bar.Miguel") may receive the data object by way of one of its virtual node IDs. This extension allows data to be placed across a set of nodes with content locality and balances storage loads by distributing data over multiple nodes within a specified organization.

In an alternative embodiment, a special marker character may be used to allow a node to decide whether it wishes to be eligible for storage of specially marked data through one of its virtual nodes. It should be understood that by creating virtual nodes, a real node is increasing its exposure to storage operations on the network. However, an organization may determine that individual nodes may be allowed to "opt in" to the possibility of storing such data. Therefore, when the storage of such data is initiated by a source node, the storage application inserts a special marker character into the data key (e.g., a domain prefix, a special marker character, and the data identifier). The special marker character is a character that is ineligible for use in a real node ID. A key may be generated using this special marker character. For example, if the special character is "!", then a key equaling "foo.bar!347234723748" indicates that only nodes that "opt-in" are matched to the key.

If a node wishes to "opt-in" and make itself available for storage of such data, it inserts the special marker character into its virtual node IDs, which are generated when it joins the network. Thereafter, data with specially marked data keys may be routed to the node through the special marked virtual node IDs. Otherwise, if no virtual node IDs are specially marked, the specially marked data keys will not match the virtual node ID prefixes in the routing tables of the network and the corresponding messages will bypass these virtual nodes.

Figure 6:
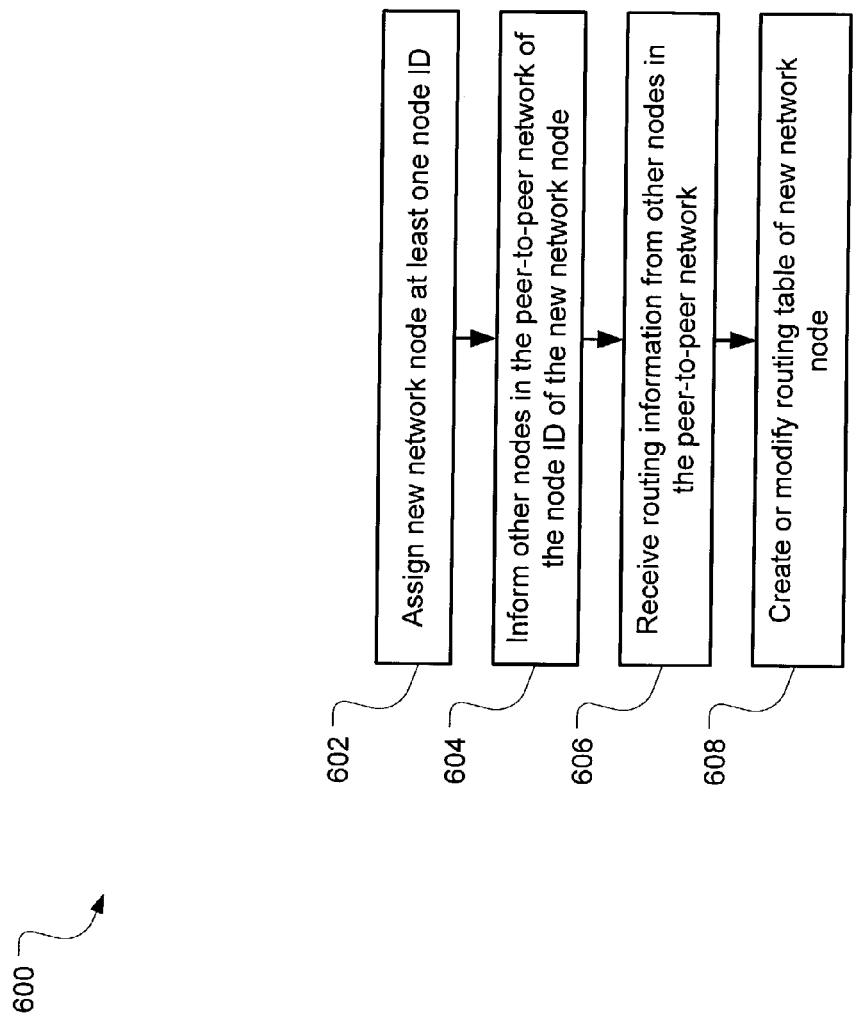
FIG. 6 illustrates exemplary operations for building a structured overlay having a hierarchical namespace.

FIG. 6 illustrates exemplary operations 600 for building a structured overlay having a hierarchical namespace. An assignment operation 602 assigns at least one node ID to a new network node that is to join the peer-to-peer overlay. One node ID will be the real hierarchical node ID of the network node. Other node IDs may also include virtual node IDs, possibly including those virtual node IDs with special marker characters to allow nodes to "opt-in" and provide load balancing for various organizational levels. A notifying operation 604 informs other nodes in the peer-to-peer overlay of the new node identifier and/or virtual node identifiers of the new node. A receipt operation 606 receives routing information (e.g., node IDs and IP addresses) of neighboring nodes. Such node IDs are defined within a hierarchical namespace and have organizational boundaries aligned with routing boundaries within each node ID. A table operation 608 creates or modifies a routing table of the new node to reflect the routing information receives from the other nodes in the peer-to-peer overlay.

Figure 7:
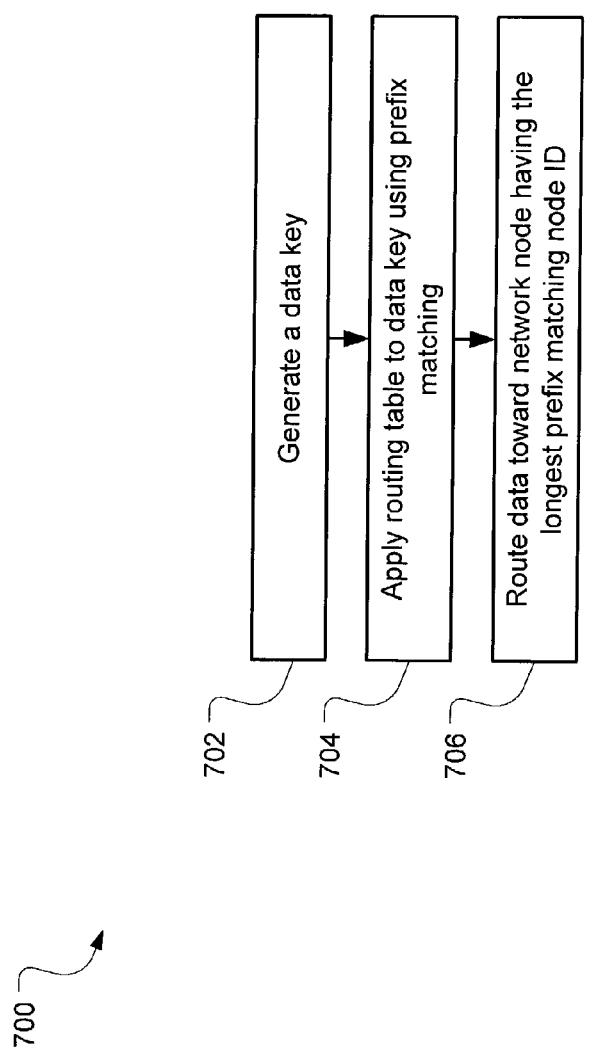
FIG. 7 illustrates exemplary operations for routing a message in a structured overlay having a hierarchical namespace.

FIG. 7 illustrates exemplary operations 700 for routing a message in a structured overlay having a hierarchical namespace. A message operation 702 generates a data key associated with the message. The data key includes a domain prefix and a data identifier. In some implementations, the domain prefix is concatenated with the data identifier. In other implementations, the data key also includes a special marker character indicating a load balancing operation into which a node may "opt in" by including the special character in its virtual node IDs.

A table operation 704 applies the routing table of the node to the data key. In one implementation, such application is performed using prefix matching, as described above. The IP address of the node identified in the routing as having a node ID with the longest prefix match to the data key is selected. A routing operation 706 routes the message to the selected IP address. The node at this selected IP address may repeat operations 704 and 706 to progressively route the message to its destination.

The exemplary hardware and operating environment of FIG. 12 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored in the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

Figure 8:
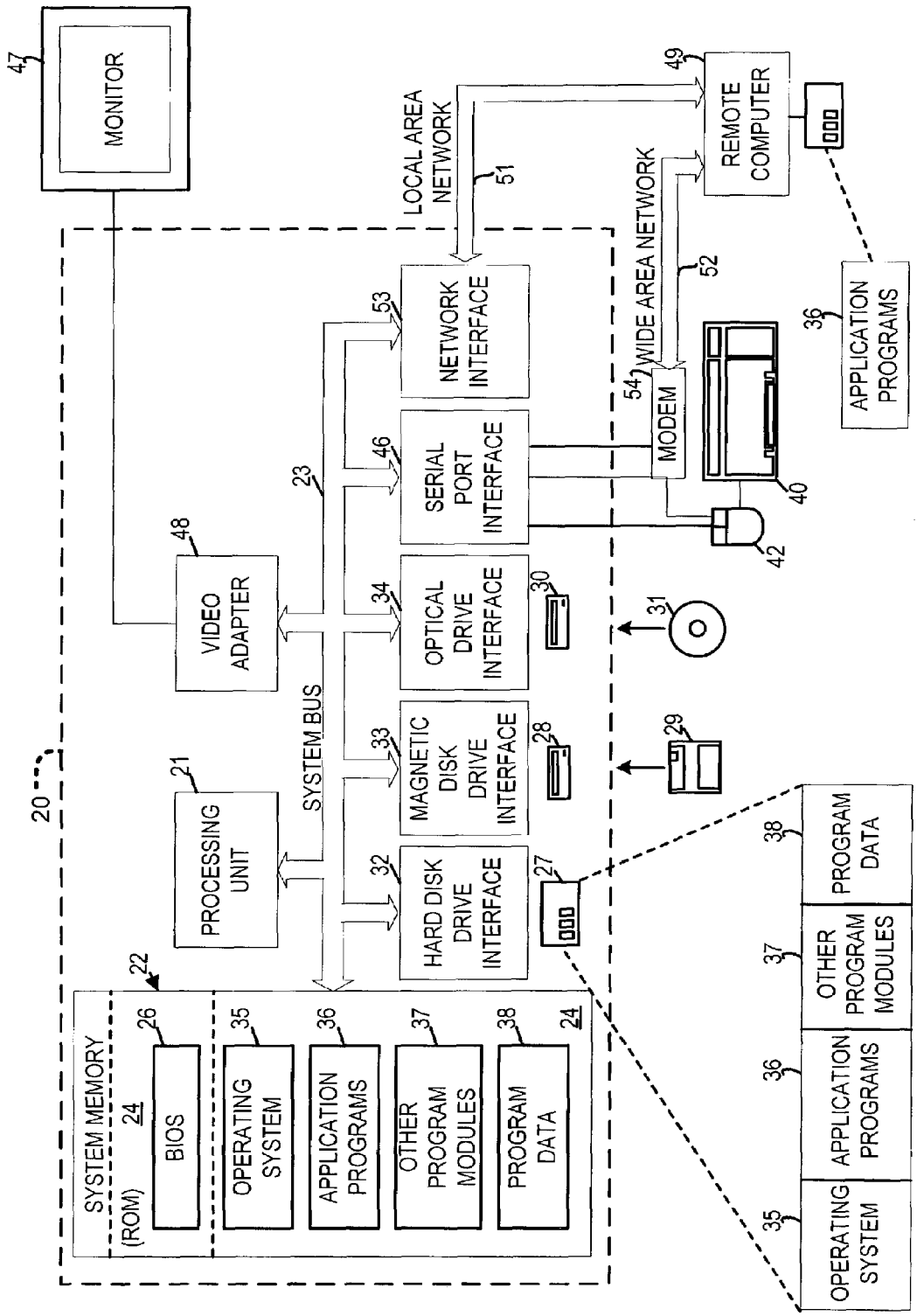
FIG. 8 illustrates an exemplary system useful for implementing an embodiment of the present invention.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 8. The logical connections depicted in FIG. 8 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

In an exemplary implementation, data key generators, hashing modules, routing modules, or other modules may be incorporated as part of the operating system 35, application programs 36, or other program modules 37. The node IDs, virtual node IDs, messages, and data keys may be stored as program data 38.

The embodiments of the invention described herein are implemented as logical steps in one or more computer systems. The logical operations of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, objects, or modules.

The above specification, examples and data provide a complete description of the structure and use of exemplary embodiments of the invention. Since many embodiments of the invention can be made without departing from the spirit and scope of the invention, the invention resides in the claims hereinafter appended.

What is claimed is:

1. A method to provide path locality when routing a message in a peer-to-peer network, comprising:

assigning a hierarchical node identifier to each of a plurality of peer-to-peer overlay nodes, wherein each hierarchical node identifier that corresponds to each of the plurality of peer-to-peer overlay nodes designates one or more organizational levels; and routing a message between two overlay nodes of the plurality of peer-to-peer overlay nodes such that the message is routed only through nodes in the plurality of peer-to-peer overlay nodes, wherein the message stays within an organization level defined by the hierarchical node identifiers of the two overlay nodes, wherein the message is routed between the two overlay nodes by performing prefix-matching using the hierarchical node identifiers of at least one of the two overlay nodes, routing the message between two overlay nodes including, at each sending node along a path through which the message is routed between the two overlay nodes:

determining a data key of the message;

when the data key is within a range of nodes in a leaf set of the sending node, determining a number of nodes of the leaf set having a longest prefix match with the data key, when the number is one, routing the message to a first node of the leaf set having the longest prefix match with the data key, and when the number is greater than one, determining, from a second set of nodes of the leaf set having the longest prefix match with the data key, a second node of the leaf set having a minimal numerical distance between the data key and a second node identifier of the second node, and routing the message to the second node of the leaf set; and when the data key is not within the range of nodes in the leaf set, determining a first shared prefix length shared by the data key and the sending node, when a routing table associated with the sending node includes a potential receiving node having a second shared prefix length shared by the potential receiving node, the second shared prefix length being larger than the first shared prefix length, routing the message to the potential receiving node, and when the routing table does not include the potential receiving node having the second shared prefix length, routing the message to a second potential receiving node, the second potential receiving node having a third shared prefix length shared by the data key and the second potential receiving node, the third shared prefix length being equal to the first shared prefix length, and the second potential receiving node having a second potential receiving node identifier that is numerically closer to the data key than a sending node identifier of the sending node.

2. The method of claim 1, wherein the node identifier is independent from an IP address of the peer-to-peer overlay node.

3. A method to provide content locality when routing a message in a peer-to-peer network, comprising:

assigning a hierarchical node identifier to each of a plurality of peer-to-peer overlay nodes, wherein each hierarchical node identifier that corresponds to each of the plurality of peer-to-peer overlay nodes designates one or more organizational levels; and generating an enhanced data key by incorporating a domain prefix into a data key of the message; and routing a message between two overlay nodes of the plurality of peer-to-peer overlay nodes such that the message is routed only through nodes in the plurality of peer-to-peer overlay nodes, wherein the message stays within an organization level defined by the hierarchical node identifiers of the two overlay nodes, wherein the message is routed between the two overlay nodes by looking up the domain prefix in the enhanced data key of the message, routing the message between two overlay nodes including, at each sending node along a path through which the message is routed between the two overlay nodes:

determining a data key of the message;

when the data key is within a range of nodes in a leaf set of the sending node, a first half of the leaf set including numerically closest larger node identifiers and a second half of the leaf set including numerically closest smaller node identifiers, determining a number of nodes of the leaf set having a longest prefix match with the data key, when the number is one, routing the message to a first node of the leaf set having the longest prefix match with the data key, and when the number is greater than one, determining, from a second set of nodes of the leaf set having the longest prefix match with the data key, a second node of the leaf set having a minimal numerical distance between the data key and a second node identifier of the second node, and routing the message to the second node of the leaf set; and when the data key is not within the range of nodes in the leaf set, determining a first shared prefix length shared by the data key and the sending node, when a routing table associated with the sending node includes a potential receiving node having a second shared prefix length shared by the potential receiving node, the second shared prefix length being larger than the first shared prefix length, routing the message to the potential receiving node, and when the routing table does not include the potential receiving node having the second shared prefix length, routing the message to a second potential receiving node, the second potential receiving node having a third shared prefix length shared by the data key and the second potential receiving node, the third shared prefix length being equal to the first shared prefix length, and the second potential receiving node having a second potential receiving node identifier that is numerically closer to the data key than a sending node identifier of the sending node.

4. The method of claim 3, wherein the node identifier is independent from an IP address of the peer-to-peer overlay node.

5. The method of claim 3, wherein the enhanced data key is used to place objects within an organization.

* * * * *